United States Patent
Argillier et al.

(10) Patent No.: US 7,273,892 B2
(45) Date of Patent: Sep. 25, 2007

(54) REVERSIBLE STABILIZED EMULSION AND METHOD FOR STABILIZING AND/OR DESTABILIZING AN EMULSION

(75) Inventors: Jean-Francois Argillier, Saint Cloud (FR); Isabelle Henaut, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 340 days.

(21) Appl. No.: 10/494,937

(22) PCT Filed: Nov. 12, 2002

(86) PCT No.: PCT/FR02/03870

§ 371 (c)(1),
(2), (4) Date: May 7, 2004

(87) PCT Pub. No.: WO03/041849

PCT Pub. Date: May 22, 2003

(65) Prior Publication Data

US 2005/0038128 A1    Feb. 17, 2005

(30) Foreign Application Priority Data

Nov. 16, 2001 (FR) .................................. 01 14816

(51) Int. Cl.
*B01K 17/00* (2006.01)
*B01K 3/08* (2006.01)

(52) U.S. Cl. ............................ 516/53; 516/20; 516/21; 516/28; 516/72; 516/75

(58) Field of Classification Search .................... 516/53
See application file for complete search history.

(56) References Cited

U.S. PATENT DOCUMENTS

| | | | |
|---|---|---|---|
| 3,647,507 A | | 3/1972 | Ashcraft |
| 3,687,845 A | | 8/1972 | Treat |
| 3,901,316 A | * | 8/1975 | Knapp ........................ 166/294 |
| 4,014,801 A | | 3/1977 | Fullinwider |
| 4,022,731 A | | 5/1977 | Schmitt |
| 4,107,073 A | | 8/1978 | Maciaszek |
| 4,179,369 A | | 12/1979 | Bradley |
| 4,411,814 A | | 10/1983 | Burkhardt |
| 6,286,601 B1 | * | 9/2001 | Argillier et al. ............ 166/309 |

FOREIGN PATENT DOCUMENTS

| | | |
|---|---|---|
| EP | 0153506 | 9/1985 |
| EP | 1013739 | 3/2000 |

* cited by examiner

*Primary Examiner*—Randy Gulakowski
*Assistant Examiner*—Timothy J. Kugel
(74) *Attorney, Agent, or Firm*—Antonelli, Terry, Stout & Kraus, LLP.

(57) ABSTRACT

The present invention relates to a stable emulsion of an immiscible fluid and of an aqueous phase having a determined pH value. The emulsion is optimized in that it comprises an ionic surfactant and a polyampholytic polymer whose charge depends on the pH value. The respective amounts of surfactant and of polymers are determined according to the charges. Stabilization or destabilization of the emulsion is adjusted by controlling the pH value.

The invention also relates to a method of stabilizing and destabilizing an emulsion comprising a surfactant combined with an ampholytic polymer.

3 Claims, No Drawings

REVERSIBLE STABILIZED EMULSION AND METHOD FOR STABILIZING AND/OR DESTABILIZING AN EMULSION

FIELD OF THE INVENTION

The present invention relates to an emulsion and to a method of controlling stabilization or destabilization of a water and oil emulsion whose emulsifying system consists of a combination of at least a cationic or anionic surfactant whose charge hardly depends on the pH value and of a polyampholytic polymer whose global charge depends on the pH value. The polyampholytic polymer according to the invention has no emulsifying property as such. For a determined pH value of the aqueous phase, the emulsifying function is optimized by adjusting the respective amounts of polyampholytic polymer and of surfactant (ionic or cationic depending on the sign of the polymer charges under these determined pH value conditions), taking as a criterion the respective charges of the polymer and of the surfactant, said charges being unlike. If the polymer is anionic, the surfactant is cationic, and vice versa. The charges of the ampholytic polymer are modified by modifying the pH value of the stabilized emulsion. The interactions of the charges between the polymer and the surfactant are therefore modified in such a way that the emulsion can be destabilized, possibly to the point of complete phase separation. It is thus possible to recover the two phases and possibly to consider recycling the various phases for further use.

The method and the composition according to the invention can be advantageously applied to any use of a stable or sufficiently stable emulsion requiring a destabilization or demulsification stage, whether in the cosmetics industry, the pharmaceutical industry, the food-processing industry, water treatment, the paper-making industry, or oil exploration or production.

SUMMARY OF THE INVENTION

The invention thus relates to a method of controlling stabilization of an emulsion, wherein the following stages are carried out:
forming an emulsion from an immiscible fluid and an aqueous solution having a determined pH value,
adding to the emulsion a surfactant whose charge does not depend on the pH value and a polyampholytic polymer whose global charge depends on the pH value,
determining the respective amounts of surfactant and of ampholytic polymer so as to optimize emulsion stabilization, notably by selecting the amount and the type of charge, considering the pH value of the emulsion, the surfactant and the polymer being oppositely charged.

According to the invention, if the pH value of the emulsion is changed, the surfactant and ampholytic polymer charge combinations are modified because the charge of the ampholytic polymer is, by definition, changed with the pH value change. Thus, the initially stable emulsion becomes unstable and the phases can be more readily separated.

According to the invention, the amount of surfactant required to stabilize the emulsion is markedly less in case of combination with a polymer as defined above. It definitely is of advantage to have a stable emulsion with small amounts of surfactant, notably less than the critical micelle concentration (CMC).

The polyampholytic polymers of the method or the emulsifying composition of the present invention are preferably selected from among the group consisting of:

a) polymers having the general formula (I) as follows:

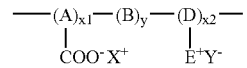

wherein A represents a group resulting from copolymerization of an ethylenic unsaturated monomer carrying an anionic group —COO⁻

$X^+$ is a cation resulting from neutralization of the anionic groups —COO⁻ by an inorganic or organic base, B is a group resulting from copolymerization of at least one hydrophilic ethylenic unsaturated monomer, preferably acrylamide, D is a group resulting from copolymerization of an ethylenic unsaturated monomer carrying a cationic group $E^+$ such that:

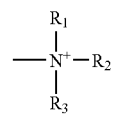

wherein R1, R2 and R3, identical or different, are hydrogen, a C1-C22 alkyl group, linear, branched or cyclic (cycloaliphatic or aromatic), $Y^-$ represents an anion resulting from neutralization of groups E by an inorganic or organic acid or from quaternization of groups E, x1, x2 and y respectively represent the molar percentages for groups A, B and D, with x1 greater than or equal to x2, and x1 +x2 +y=1, b) betainic polymers of formula as follows:

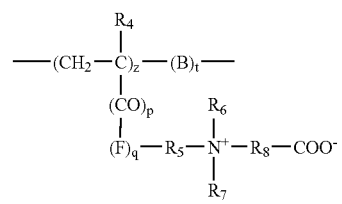

wherein:
R4, R6 and R7, identical or different, represent a hydrogen or a C1-C4 alkyl, linear or branched, F represents NH or O or forms with group R5 a C5-C7 cycle or heterocycle, aromatic or non-aromatic, R5 and R8 represent, independently of one another, a divalent hydrocarbon group, in particular a —(CH2)n— group with n an integer ranging from 1 to 4, R5 can form with R6 and R7 a C5-C7 heterocycle, B is a group resulting from copolymerization of at least one hydrophilic ethylenic unsaturated monomer, preferably acrylamide, z and t are the molar percentages of the groups, such that z+t=1, p is 0 or 1 and q is 0 or 1.

In the general formula (I) as defined above, the monomers leading after copolymerization to the units of structure:

are selected from salts of linear, branched or cyclic carboxylic acids (cycloaliphatic or aromatic such as salts of crotonic acid, acrylic acid, metacrylic acid, vinylbenzoic acid; carboxylic diacid salts such as salts of maleic, fumaric or itaconic acid, as well as their monoesters and monoacids; the counter-ion $X^+$ associated with $COO^-$ generally results from neutralization of the $COO^-$ group by an inorganic base such as NaOH or KOH or an organic base such as an amine or an aminoalcohol.

In general formula (I), the monomers leading to the units of structure —B— are selected from among the hydrophilic ethylenic unsaturated monomers and are selected in such a way that the final polymer is water-soluble.

In general formula (I), the monomers leading to the units of structure:

are preferably selected from monomers of acrylic, vinylic, allylic or diallylic type comprising a tertiary amine function quaternized by an alkyl halogenide or a dialkyl sulfate.

The following can for example be mentioned:
dimethylaminoethylacrylate,
diethylaminoethylacrylate,
dimethylaminopropylacrylate,
dimethylaminopropylacrylamide,
2-vinylpyridine,
4-vinylpyridine,
dimethylallylamine, quaternized by an alkyl halogenide or a dialkyl sulfate.

The polyampholytes of formula (I) which are particularly preferred are selected from among sodium acrylate, acrylamide and acryloxyethytrimethylammonium copolymers.

The molecular weights of the polyampholytes according to the invention can range from 5000 to 10,000,000, preferably between 100,000 and 2,000,000.

It is possible to use in the present invention as surfactants combined with the polyampholytic polymer all the conventional anionic surfactants, such that the anionic function is:
sulfonates:
    alkylbenzene sulfonates,
    paraffin sulfonates,
    α-olefin sulfonates,
    petroleum sulfonates,
    lignosulfonates,
    sulfosuccinic derivatives,
    polynaphthylmethane sulfonates,
    alkyltaurides,
sulfates:
    alkyl sulfates,
    alkylether sulfates,
phosphates:
    monoalkyl phosphates,
    dialkyl phosphates,
phosphonates.

The following cationic surfactants can be mentioned:
quaternary ammonium salts whose nitrogen:
    comprises a fatty chain, for example, alkyltrimethyl or triethyl ammonium derivatives, alkyldimethyl benzylammonium derivatives,
    comprises two fatty chains,
    is part of a heterocyclic structure, for example, pyridinium, imidazolinium, quinolinium, piperidinium, morpholinium derivatives.

Other features and advantages of the present invention will be clear from reading the description of non limitative tests hereafter.

The tests are mainly based on the comparison, for different compositions of emulsifying agents (surfactants and polymers), of the emulsion stability measurement during bottle tests as a function of the pH value. Stability is evaluated by determining two half life times as defined below:

The emulsions are prepared as follows:

The surfactant at variable concentration and the hydrosoluble polymer, also at variable concentration, are incorporated to the aqueous phase. The pH value is then adjusted by addition of acid or soda. Emulsification is carried out at ambient temperature in a 200-ml beaker by means of a HEILDOPH stirrer provided with a three-paddle propeller. The rotating speed is generally 800 rpm. In general, the stirring time is about 20 minutes. Addition of oil is carried out by means of a disposable syringe in the aqueous solution. The ratio of the water/oil phases is variable. In the following examples, it is of the order of 30 to 40% by volume of oil and 70 to 60% by volume of water, but these tests are not limitative. In all of the examples described, the emulsions obtained are of oil-in-water type.

The bottle tests allow to monitor the behavior of the emulsion formed in the course of time. The total volume of freshly manufactured emulsion is fed into a 100-ml test tube. The emulsion is then regularly observed so as to determine the kinetics of the separation phenomena.

In our system, the various phenomena observed are:
emulsion creaming,
oil coalescence.

The volumes of the emulsion-water and emulsion-oil fronts (when the emulsion breaks) are thus recorded as a function of time in order to allow determination of the half life times of the water ($T_{1/2\ water}$) and of the oil, dodecane for example ($T_{1/2\ dodecane}$). The half life times are defined as the times from which half the volume of the phase considered has been recovered. Recovered is understood to mean non-emulsified.

The destabilization mechanisms observed can be described as follows:

In the initial state, i.e. at t=0, the emulsion is homogeneous, the oil droplets are homogeneously distributed within the continuous phase.

During stage 1, the phenomenon of oil droplets creaming is observed, a water-emulsion front is thus present, separating two distinct phases : the aqueous phase at the bottom and the emulsion phase above.

During stage 2, the creaming phenomenon clearly slows down, and coalescence of the oil droplets is observed. A third phase therefore appears : the oil phase. During this stage, the evolution rate of the water-emulsion front is much higher than the evolution rate of the oil-emulsion front.

In the final state, total destabilization of the emulsion is observed. We therefore have a system only consisting of the two phases brought together : the upper phase consisting of oil and the lower phase consisting of water.

Systems tested
1) Surfactants
Dodecyltrimethyl ammonium bromide (DOTAB): cationic surfactant having the general formula as follows:

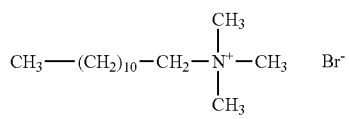

2) Polymers
Acrylamide/Acrylic acid copolymer (AM/AA) of general formula as follows:

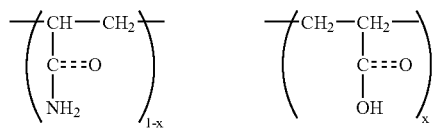

One of the characteristics of the polymers is their viscosity at 10% active matter in water (Vis) expressed in centipoise.

*AM/AA* 90/10x=10% and Vis=25000 cP

*AM/AA* 90/10x=10% and Vis=8000 cP

*AM/AA* 90/10x=10% and Vis=3500 cP

*AM/AA* 80/20x=20% and Vis=3600 cP.

In the examples, the oil phase is dodecane : the dodecane used has a minimum purity of 95% and contains at least 35% n-dodecane. It is a colorless oil of empirical formula=$C_{12}H_{26}$ (M=170 g/mol; $T_F$=−9.9° C., $T_{eb}$=215-217° C., $d_{15}$=0.75). The experimental conditions of the tests are summarized in the table hereafter:

| Emulsion type | Direct emulsion |
| --- | --- |
|  | Dodecane in distilled water |
| Oil/water proportions | 40/60 |
| Volume prepared | 100 ml |
| Surfactant and/or polymer brought into solution | In distilled water |
| Temperature | Ambient |
| Stirring type | Heildoph/3-paddle propeller |
| Stirring rate | 800 rpm |
| Stirring time | 20 minutes |

Test No.1: Influence of the pH value

The system studied consists of DOTAB at a concentration equal to CMC/10, i.e. 1.5 mmol/l, and of the AM/AA 90/10 (visco=3500cP) polymer at 1 g/l.

The following table gives the half life times of the dodecane and of the water according to the pH value, considering the system studied:

| pH value | T1/2 dodecane (minute) | T1/2 water (minute) |
| --- | --- | --- |
| 1 | 2 | 1.3 |
| 3 | 2.3 | 1.8 |
| 5 | 3.2 | 1.6 |

-continued

| pH value | T1/2 dodecane (minute) | T1/2 water (minute) |
| --- | --- | --- |
| 7 | 16.5 | 2.9 |
| 9 | 17.0 | 2.9 |
| 11 | 17.1 | 2.9 |
| 13 | 17.1 | 2.9 |

These results show, in particular for the half life time of the dodecane, that the stability towards the coalescence phenomenon is much higher with a basic pH (pH>6.5) than with an acid pH (pH<5). These effects are linked with the charge of the acrylic polymer which evolves with the pH value. With a basic pH, the carboxylic functions are charged in form of carboxylates (their number depends on the pH value) and the polymer is negatively charged; an interfacial complex forms between the surfactant and the polymer by electrostatic attraction. This complex stabilizes the emulsion. With an acid pH, the polymer is not charged and does not interact with the surfactant. Now, with the low surfactant concentrations used (<CMC, Critical Micelle Concentration), the surfactant alone cannot stabilize the emulsion. This test shows how the stability of the emulsion can be controlled with an ampholytic polymer by controlling the pH value.

Test No.2: Influence of the Surfactant Concentration

The polymer is AM/AA (90/10, Vis=3500 cP) and the surfactant is DoTAB. The tests were carried out at two pH values : pH=8 and pH=1. At pH=1, the polymer is non-charged, whereas at pH=8, at least part of the acrylic functions is in form of negatively charged acrylates.

The results are as follows:

|  | Conc. | T 1/2 water (min) | | T 1/2 dodecane (min) | |
| --- | --- | --- | --- | --- | --- |
| DOTAB | (mmol/l) | pH = 7 | pH = 1 | pH = 7 | pH = 1 |
| No surfactant | 0 | <0.6 | <0.6 | <0.6 | <0.6 |
| 2.5/100 CMC | 0.375 | 1.5 | 0.6 | 5.5 | 0.7 |
| 5/100 CMC | 0.75 | 3.7 | 1.6 | 15.8 | 2.3 |
| 1/10 CMC | 1.5 | 2.9 | 1.3 | 16.5 | 2 |
| 2/10 CMC | 3 | 2.8 | 2.4 | 11.8 | 3 |
| 3/10 CMC | 4.5 | 2.7 | 2.3 | 10.8 | 3.5 |

The presence of polymer in an alkaline medium leads to a notable stabilization of the emulsion, in particular for the $T_{1/2}$ of the dodecane. On the other hand, in an acid medium, addition of polymer has no significant effect. This study also shows that the system studied works better for DOTAB concentrations below $2/10^{th}$ of the CMC. The stabilization decrease in the alkaline medium above $2/10^{th}$ of the CMC can be explained by the fact that, for these concentrations in the presence of polymer, a cloudiness is observed, which is proof of the formation of a surfactant-polymer complex in the volume and no longer only an interfacial complex.

Test No.3: Influence of the Polymer Concentration

The polymer used is AM/AA (90/10, Vis=3500 cP). The results are given in the table hereafter:

| AM/AA (90/10, | [DOTAB] | T 1/2 water (min) | | T 1/2 dodecane (min) | |
|---|---|---|---|---|---|
| vis = 3500 cP) | (mmol/l) | pH = 7 | pH = 1 | pH = 7 | pH = 1 |
| No polymer | 1.5 | <0.6 | <0.6 | <0.6 | <0.6 |
| 0.5 g/l | 1.5 | 1.40 | 1.70 | 8.6 | 1.7 |
| 1 g/l | 1.5 | 2.9 | 1.3 | 16.5 | 2 |

These tests show that the polymer concentration is a parameter that influences the emulsion stability. Thus, an increase in the polymer concentration leads, with a basic pH, to a significant stabilization increase. With an acid pH, the influence of the polymer is very weak and the emulsion remains unstable.

Test No.4: Influence of the Polymer Mass

The polymers used are the AM/AA 90/10 copolymers of different molecular masses (characterized by their viscosity at 10%). The polymer concentration is 1 g/l. The pH value is adjusted at 7.

The results are as follows:

| Polymer | [DOTAB] | T 1/2 water (min) | | T 1/2 dodecane (min) | |
|---|---|---|---|---|---|
| viscosity (cP) | (mmol/l) | pH = 8 | pH = 1 | PH = 8 | pH = 1 |
| 25000 | 1.5 | 6.6 | 1.1 | 34.8 | 1.4 |
| 8000 | 1.5 | 4.60 | 2.60 | 15.6 | 2.6 |
| 2500 | 1.5 | 2.9 | 1.3 | 16.5 | 2 |

These tests show that the higher the mass of the polymer, the better the stabilization quality with a basic pH for the same concentration. In fact, this could be explained by the fact that the longer the chain, the greater the steric hindrance at the interface, which consequently leads to a greater stabilization effect. It can also be noted that, in an acid medium, the effect is not significant and the emulsion remains unstable.

Test No.5: Influence of the Polymer Charge Rate

The polymers used are AM/AA 90/10 (Vis=3500 cP) and AM/AA 80/20 (Vis=3600 cP) at a concentration of 1 g/l. The pH value is 7.

The results are:

| | [DOTAB] | T 1/2 water (min) | | T 1/2 dodecane (min) | |
|---|---|---|---|---|---|
| Polymer | (mmol/) | pH = 8 | pH = 1 | pH = 8 | pH = 1 |
| No polymer | 1.5 | <0.6 | <0.6 | <0.6 | <0.6 |
| AM/AA 90/10 | 1.5 | 2.9 | 1.3 | 16.5 | 2 |
| AM/AA 80/20 | 1.5 | 14.4 | 0.8 | 254.3 | 1.8 |

It appears that the charge rate of the polymer plays an important part in the stabilization efficiency of the emulsions at basic pH. In fact, the mass being equivalent, a polymer twice as charged allows to multiply by 15 the half life times. This can be explained by the fact that the polymer containing more charged monomers forms a more stable electrostatic complex with the surfactant molecules because of the greater number of electrostatic interactions for the same chain length. On the other hand, in an acid medium, the effect is not significant and the emulsion is unstable.

Test No.6: Influence of the Ionic Strength

The polymer used is AM/AA 80/20 (Vis=3600 cP) at a concentration of 1 g/l at pH 7. The DOTAB concentration is 1.5 mmol/l. In order to study the influence of the ionic strength on the stability of an emulsion of the same formulation, sodium chloride is added to the aqueous phase in a studied concentration range between 0 and 1 mol/l.

The results are:

| [NaCl] (mol/l) | T1/2 water (min) | T1/2 dodecane (min) |
|---|---|---|
| 0 | 14.4 | 254 |
| $10^{-4}$ | 9.4 | 231 |
| $10^{-3}$ | 6 | 156 |
| $10^{-2}$ | 3.8 | 66 |
| $10^{-1}$ | 3.2 | 8.9 |
| 1 | 1 | 2.7 |

The results show that the presence of sodium chloride in the continuous phase actually leads to a decrease in the emulsion stability. This sensitivity to the ionic strength was expected because of the role of the electrostatic interactions on the formation of the interfacial complex.

Test No.7:

The surfactant is DOTAB and the polymer is AM/AMPS. The DOTAB concentration is 1.5 mmol/l. The tests were carried out with two pH values. The polymer used is AM/AMPS (80/20). The negative charge is provided by the non pH-dependent $SO_3^-$ functions.

The results are:

| pH = 8 | T1/2 water (min) | T1/2 dodecane (min) |
|---|---|---|
| Without polymer | <0.6 | <0.6 |
| AM/AMPS 80/20 1 g/l | 15.5 | 158.5 |

| pH = 1 | T1/2 water (min) | T1/2 dodecane (min) |
|---|---|---|
| Without polymer | <0.6 | <0.6 |
| AM/AMPS 80/20 1 g/l | 4.4 | 96 |

We observe that the presence of this polymer at pH=8 considerably increases the emulsion stability. Since the charge does not depend on the pH value, no strong effects can be expected from the pH. The results however show a destabilization from pH=8 to pH=1, which can be explained by the increase in the ionic strength of the medium by addition of HCl concentrated at 10 mol/l (about 0.5 ml in 60 ml aqueous phase, i.e. a chloride concentration of $8.10^{-2}$ mol/l) to obtain pH=1. This concentration is sufficient to generate a slight emulsion destabilization as described in the previous example. However, the polymer remaining globally anionic, the pH only has a limited effect on the emulsion stability.

The invention claimed is:

1. A reversible stabilized emulsion comprising an immiscible fluid and of an aqueous solution having a determined pH value, and comprising at least an ionic surfactant whose charge hardly depends on the pH value and a polyampholytic polymer whose global charge depends on the pH value, the surfactant and the polymer being oppositely charged, the respective amounts of surfactant and of ampholytic polymer being determined to stabilize said emulsion at said pH value, said ampholytic polymer being selected from the group consisting of:

a) polymers having the general formula (I) as follows:

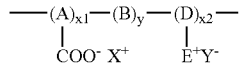

wherein A represents a group resulting from copolymerization of an ethylenic unsaturated monomer carrying an anionic group —COO⁻

$X^+$ is a cation resulting from neutralization of the anionic groups —COO⁻ by an inorganic or organic base, B is a group resulting from copolymerization of at least one hydrophilic ethylenic unsaturated monomer, preferably acrylamide, D is a group resulting from copolymerization of an ethylenic unsaturated monomer carrying a cationic group $E^+$ represented by:

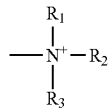

wherein R1, R2 and R3, identical or different, are hydrogen, a C1-C22 alkyl group, linear, branched or cyclic (cycloaliphatic or aromatic), $Y^-$ represents an anion resulting from neutralization of groups E by an inorganic or organic acid or from quaternization of groups E, x1, x2 and y respectively represent the molar percentages for groups A, B and D, with x1 greater than or equal to x2, and x1+x2+y=1, b) betainic polymers of formulas as follows:

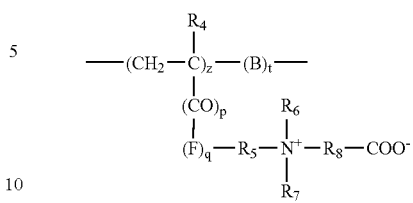

wherein:

R4, R6 and R7, identical or different, represent a hydrogen or a C1-C4 alkyl, linear or branched, F represents NH or O or forms with group R5 a C5-C7 cycle or heterocycle, aromatic or non-aromatic, R5 and R8 represent, independently of one another, a divalent hydrocarbon group, in particular a —(CH2)n— group with n an integer ranging from 1 to 4, R5 can form with R6 and R7 a C5-C7 heterocycle, B is a group resulting from copolymerization of at least one hydrophilic ethylenic unsaturated monomer, preferably acrylamide, z and t are the molar percentages of the groups, such that z+t=1, p is 0 or 1 and q is 0 or 1, said emulsion being able to be reversibly demulsified or emulsified through control of the pH value.

2. An emulsion as claimed in claim 1, wherein the surfactant concentration is less than the critical micelle concentration.

3. An emulsion as claimed in claim 2, wherein the immiscible fluid is oil.

* * * * *